United States Patent
Glick

(10) Patent No.: US 8,656,489 B1
(45) Date of Patent: Feb. 18, 2014

(54) METHOD AND APPARATUS FOR ACCELERATING LOAD-POINT SCANNING

(75) Inventor: Adam Glick, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 1617 days.

(21) Appl. No.: 11/864,955

(22) Filed: Sep. 29, 2007

(51) Int. Cl.
*G06F 21/00* (2013.01)

(52) U.S. Cl.
USPC ............ 726/22; 713/188; 709/224; 707/705; 707/692; 726/23; 726/24; 714/718; 714/723

(58) Field of Classification Search
USPC ......................................................... 726/22
See application file for complete search history.

(56) References Cited

U.S. PATENT DOCUMENTS

| | | | | |
|---|---|---|---|---|
| 5,502,815 | A * | 3/1996 | Cozza | 714/38 |
| 6,016,546 | A * | 1/2000 | Kephart et al. | 726/24 |
| 6,021,510 | A * | 2/2000 | Nachenberg | 714/38 |
| 6,611,925 | B1 * | 8/2003 | Spear | 714/38 |
| 6,763,466 | B1 * | 7/2004 | Glover | 726/24 |
| 6,851,057 | B1 * | 2/2005 | Nachenberg | 726/24 |
| 7,266,843 | B2 * | 9/2007 | Tarbotton et al. | 726/22 |
| 7,469,419 | B2 * | 12/2008 | Sobel | 726/24 |
| 7,861,296 | B2 * | 12/2010 | Costea et al. | 726/22 |
| 8,375,368 | B2 * | 2/2013 | Tuck et al. | 717/130 |
| 8,539,582 | B1 * | 9/2013 | Aziz et al. | 726/24 |
| 2002/0016925 | A1 * | 2/2002 | Pennec et al. | 713/201 |
| 2002/0087479 | A1 * | 7/2002 | Malcolm | 705/64 |
| 2003/0120952 | A1 * | 6/2003 | Tarbotton et al. | 713/201 |
| 2009/0044276 | A1 * | 2/2009 | Abdel-Aziz et al. | 726/24 |
| 2009/0064332 | A1 * | 3/2009 | Porras et al. | 726/23 |
| 2009/0222923 | A1 * | 9/2009 | Dixon | 726/24 |

OTHER PUBLICATIONS

Sophos Anti-Virus for Linux|http://tw.sophos.com/sophos/docs/eng/manuals/savl_7_umeng.pdf|2011|Version 7|Sophos|pp. 1-68.*

* cited by examiner

*Primary Examiner* — Mahfuzur Rahman
(74) *Attorney, Agent, or Firm* — Wilmer Cutler Pickering Hale and Dorr LLP

(57) ABSTRACT

A method and apparatus for accelerating a load point scanning process. In one embodiment, the method and apparatus comprise creating, at an initial scan, a detection area map identifying files referenced by detection areas. Upon a subsequent scan, determining whether the detection area has changed with respect to the detection area map. If the detection area map has changed, re-evaluating the detection area and repopulating the detection area map entry. In another embodiment, the method and apparatus avoid rescanning files as allowed using information in a file attribute cache.

14 Claims, 3 Drawing Sheets

METHOD AND APPARATUS FOR ACCELERATING LOAD-POINT SCANNING

BACKGROUND OF THE INVENTION

1. Field of the Invention

Embodiments of the present invention generally relate to file and application scanning techniques and, more particularly, to a method and apparatus for accelerating load-point scanning.

2. Description of the Related Art

To protect computers from malicious software, viruses, and other files and executable code that may be undesired by a user, scanning software is utilized to detect and remove such undesirable files and software. Generally, upon the "boot-up" of a computer, at the user's request, at user logon, at scheduled times or in response to system events, scanning software scans each of the active executable software applications as well as files being used at that moment. The intent of the scan is to detect any unwanted or undesirable executable software or files that have been installed on the system. Such scans may occur at other so-called "load-points" during computer use. These load points include items the system loads automatically such as Run Key entries (which run when the system starts or the user logs on), services (which often start when the system starts), drivers (which often start when the system starts), Browser Helper Objects (which run as needed by the web browser), command handlers (which run when a user "double clicks" on a file with a given extension such as .exe, .com, .bat, .doc, etc.), and many more items. One such scanning software that provides such load point scanning is NORTON's QUICKSCANS, generally a portion of NORTON INTERNET SECURITY; NORTON ANTIVIRUS, and other SYMANTEC SECURITY products, which is manufactured and distributed by Symantec Corporation.

Although scanning at each load-point and/or at the user's request provides substantial protection for the computer and its user, such repeated use of scanning software consumes a substantial amount of computing time to examine every load-point, resolve each entry to determine what files are referenced, and scan the target files. Although it is rare that load-points or the files they point to are modified between scans, the scanning software will scan the files anyway. Such scanning may impact a user's computing experience by slowing computer performance or extending the load time for software.

Therefore, there is a need in the art for a method and apparatus that accelerates the scanning process, especially for load-point scanning.

SUMMARY OF THE INVENTION

Embodiments of the present invention generally comprise a method and apparatus for accelerating a load point scanning process. In one embodiment, the method and apparatus comprise creating a detection area map identifying all files referenced by each load point. Upon a subsequent scan, determining whether the detection area has changed with respect to the detection area map, and, if a change has occurred, re-evaluating the detection area and re-populating the detection area map entry for this detection area. In another embodiment, the method and apparatus avoid rescanning files as allowed using information in a file attribute cache.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Figure 1:
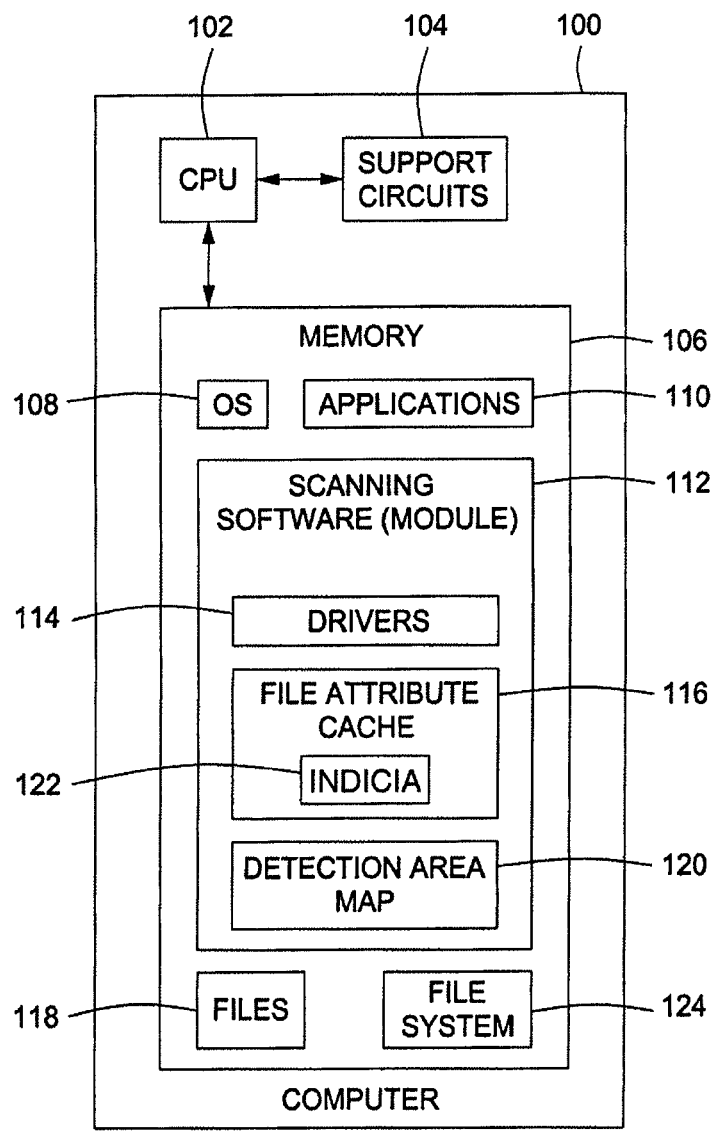
FIG. 1 is a block diagram of a computer arranged according to one embodiment of the present invention.

FIG. 1 is a block diagram illustrating a computer 100 that utilizes scanning software 112 in accordance with the present invention. The computer 100 comprises a central processing unit (CPU) 102, various support circuits 104, and a memory 106. The CPU 102 may comprise a microprocessor, instruction set processor, a microcontroller, or similar processing element known in the art. Various support circuits 104 may include power supplies, clock circuits, data registers, I/O circuitry, and the like to facilitate operation of the CPU 102. The memory 106 may comprise random access memory, read-only memory, removable storage, hard disk storage, flash drives, or any combination thereof. The support circuits 104 and the memory 106 are coupled to the CPU 102.

The memory 106 comprises an operating system 108, one or more applications 110, one or more files 118, and the scanning software 112. The scanning software 112 comprises drivers 114, a detection area map 120 and, optionally, a file attribute cache 116 with indicia 122 that a file need not be scanned, e.g., the file was previously scanned clean with definition set x, the file has been digitally signed by a trusted signer, the file has not been modified for longer than z months, and the like.

In operation, upon initial activation, the computer 100 boots-up the operating system 108 and any applications and/or files that are necessary for starting the computer. During the initial start-up, a number of load-points may be utilized. For example, items in a start-up folder may be executed at a particular point in the start-up process as well as driver and services loading. At the end of the startup process and/or at particular load-points during the process, in one embodiment, the scanning software 112 is executed to perform a scan of the files and/or applications that have been thus far launched by the computer 100. In other embodiments, the scan may begin upon user logon, user input (on-demand scan), system events, a scheduled event, and the like. Upon execution, the scanning software causes the CPU to operate as a scanning module. The scanning software 112 proceeds to scan each application and/or file that is executing to ensure that no malicious or undesirable software and/or files have been launched. Generally, the scan matches entries in a database of malicious or undesirable software and files to the software and files that are currently running on the computer. The scanning process may also use heuristics to "convict" software based on behavior or other attributes. If any such malicious or undesired software and/or files are identified, the user is generally notified of their existence. Once identified, the scanning software 112 can remove or quarantine the malicious or undesirable software and/or files in a conventional manner.

In accordance with one embodiment of the invention, the scanning software 112 initially performs an entire scan of the applications and files in a conventional manner and creates a detection area map 120 that identifies the files and/or applications referenced by each detection area (i.e., the detection area is evaluated). Information is also gathered on each file, including but not limited to, digital signature information, last modification date, and results of previous file scans. These attributes form indicia 122 that indicates whether a file requires scanning, or not.

For each subsequent scan, the scanning software 112 launches and determines whether the detection area has changed since the prior scan. To facilitate change detection, the drivers 114 monitor the load-points to determine if additional files/applications have been loaded at a given load-point, i.e., the drivers monitor registry calls and file system calls. Upon a change being detected by a driver 114, the driver sets a detection bit that will indicate that the detection area corresponding to the load-point has been changed. Thus, upon the next scan, the scan will re-evaluate the detection area.

Upon a change being detected, the scan software 112 re-evaluates the detection area to produce an updated detection area map. If the detection change bit has not been changed, then the scanning software 112 will not rescan the detection area. As such, the scanning process is accelerated by not having to reevaluate the load-point, i.e., "build" an understanding of the detection area for the load-point at each scan and not scanning when no changes have occurred at the load-point since the last scan.

To further accelerate the scanning process, a file attribute cache 116 is optionally used to identify specific files that have been changed within the detection area. The file attribute cache is populated by the drivers 114 monitoring a file system 124 for files 118 that are loaded at a load-point. These specifically identified changed files are rescanned, which are identified by an indicia that a file need not be scanned contained in the file attribute cache 116. As such, upon a change being identified in the detection area, only the files that are changed (including new files loaded at the load-point) are rescanned. Such limited file rescanning substantially accelerates the scanning process.

Figure 2:
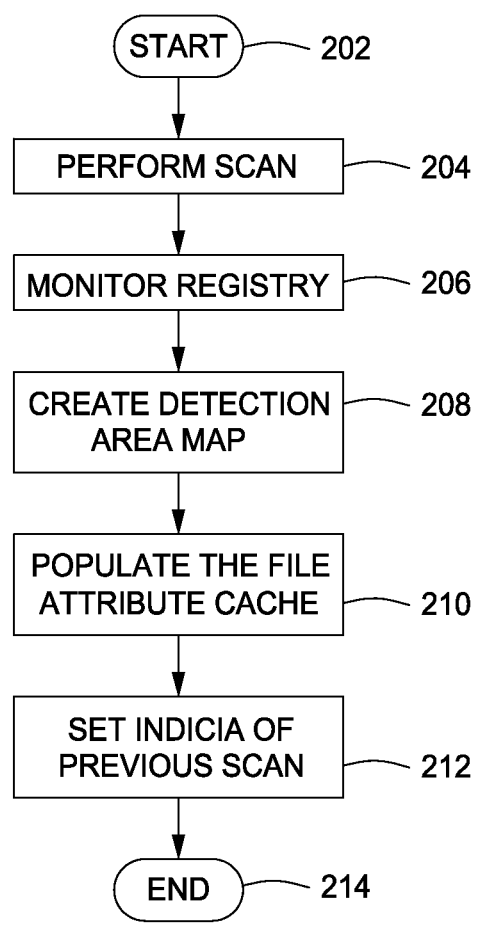
FIG. 2 is a flow diagram illustrating a method for creating a detection area map during an initial software/file scan according to one embodiment of the present invention.

FIG. 2 depicts a flow diagram of a method 200 performed when the scanning software initially scans files/applications. The method 200 begins at step 202 and proceeds to step 204, where the scanning software performs a conventional scan of the files and/or applications. At step 206, the scanning software monitors the load-points, e.g., the registry entries or files, for changes that affect automatic loading of application by the operating system. At step 208, the information gleaned from the initial scan is used to create a detection area map. The detection area map is stored in memory. In addition, at step 210, the drivers gather information from the file system to identify the files that are called during the load-point and assigned to the registries. The attributes of these files are optionally stored in the file attribute cache along with indicia that a file need not be scanned at step 212. The initial scan process ends at step 214. The method 200 is executed upon the initial utilization of each load-point, or whenever a scan is performed.

Figure 3:
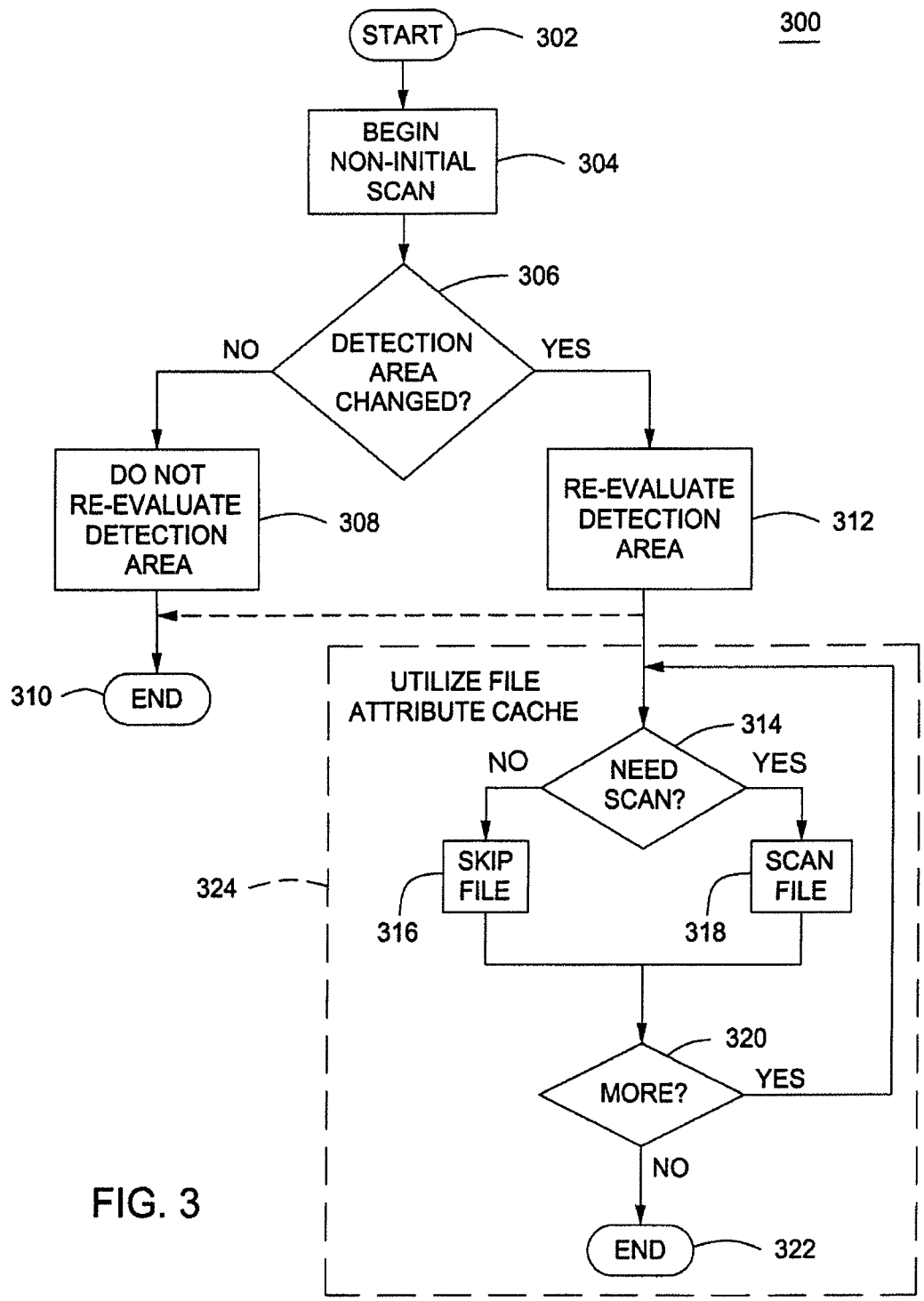
FIG. 3 is a flow diagram illustrating a method for subsequently scanning computer files and software in accordance with one embodiment of the present invention.

FIG. 3 depicts a flow diagram of a method 300 of performing subsequent (non-initial) scanning. The method 300 begins at step 302 and proceeds to step 304, wherein the scanning software begins the scanning process. At step 306, the method 300 queries whether the detection area has been changed. The detection area is identified as being changed when a detection area change bit has been altered by the driver(s) of the scanning software. The drivers monitor the registries used at each load-point as well as the files and/or applications that are loaded at the load-point. Upon comparison of the registries presently used at the load-point with the detection area map, a difference therein indicates a change. Such change results in a change bit being set for that detection area. If the detection area change bit is not set (unchanged from the initial setting), then the query at step 306 is negatively answered, and the method 300 proceeds to step 308. At step 308, the method does not re-evaluate the detection area because it is deemed to be unchanged. The method ends at step 310.

If, on the other hand, the query at step 306 is affirmatively answered and the detection area has been changed since the prior scan, the method 300 proceeds to step 312 wherein the detection area is re-evaluated once again. In essence, the scanning will be performed as discussed with reference to method 200 of FIG. 2. In short, a conventional scan is performed of the detection area, e.g., files and applications corresponding thereto to create a new detection area map. Once the detection area has been re-evaluated, the method may end at step 310.

In an alternative embodiment, a further acceleration to the scanning process is provided by the use of a file attribute cache at step 324. Once the method 300 deems that the detection area must be scanned again at step 312, the file attribute cache is accessed to determine if there are certain files that do not have to be scanned. The determination of rescanning is based upon the status of the indicia indicating whether a scan is needed or not. The drivers, if change in a file is detected through monitoring the file system, update the indicia to indicate that a scan is needed. This "unsetting" or clearing the indicia informs method 300 that the particular file is to be rescanned.

At step 314, the method 300 queries whether a scan is needed. If a scan is not needed, then the query at step 314 is negatively answered, and the method proceeds to step 316. At step 316, the file is skipped because it has been previously scanned. If, on the other hand, the query at step 314 is affirmatively answered, the method 300 will proceed to step 318 where the file needing a scan is rescanned. At step 320, the method 300 queries whether more files are to be analyzed that are in the file attribute cache. This loop is utilized repeatedly until all the files in the detection area have either been scanned or not scanned as necessary. Once complete, the query at step 320 is negatively answered, and the method 300 ends at step 322.

By executing scanning software in this manner, where a scan detection area map is created and that detection area may not be re-evaluated if it has not changed from the prior scan, substantially accelerates the scanning process. Thus, reevaluation by the scanning software is avoided for most load-points, i.e., the files/applications loaded at a load-point do not often change. Further acceleration may be provided by the use of a file attribute cache that enables specific files within the detection area to be skipped from scanning depending on stored attributes of the file (i.e., previously scanned, digitally signed, last modification date and the like) have not changed since the prior scan.

While the foregoing is directed to embodiments of the present invention, other and further embodiments of the invention may be devised without departing from the basic scope thereof, and the scope thereof is determined by the claims that follow.

What is claimed is:

1. A computer-implemented method of accelerating a scanning process comprising:
    creating, via at least one computer processor, a detection area map corresponding to a load-point, wherein the detection area map identifies one or more files loaded at the load-point, and wherein the detection area map comprises, for the one or more files, at least one of digital signature information, last modification date, and results of previous file scans of the one or more files identified within the detection area map;
    creating a file attribute cache comprising information about at least one file to determine if the at least one file requires scanning, wherein the file attribute cache further comprises an indicia of a definition set used to scan a file;
    upon subsequent scanning, determining whether a detection area has changed with respect to the detection area map; and
    re-evaluating the detection area in response to a change to the detection area.

2. The method of claim 1, further comprising:
    monitoring load points to determine when entries in the detection area map are no longer valid.

3. The method of claim 1, further comprising:
    upon modification of the at least one file, creating indicia to indicate the at least one file requiring scanning.

4. The method of claim 1, wherein re-evaluating the detection area comprises scanning the detection area for malicious software.

5. A method of accelerating a scanning process comprising:
    creating, using at least one computer processor, a detection area map corresponding to a load-point, wherein the detection area map identifies one or more files loaded at the load-point, and wherein the detection area map comprises, for the one or more files, at least one of digital signature information, last modification date, and results of previous file scans of the one or more files identified within the detection area map;
    creating a file attribute cache comprising information about at least one file to determine if the at least one file requires scanning, wherein the file attribute cache further comprises an indicia of a definition set used to scan a file; and
    upon subsequent scanning, determining whether a detection area has changed with respect to the detection area map by identifying at least one changed file referenced by the detection area map;
    re-evaluating the detection area and scanning the at least one changed file identified as requiring scanning in response to a change in the detection area.

6. The method of claim 5, further comprising:
    monitoring load points to determine when entries in the detection area are no longer valid.

7. The method of claim 5, further comprising:
    upon modification of the at least one file, creating indicia to indicate the at least one file requiring scanning.

8. The method of claim 5, wherein re-evaluating the detection area comprises scanning the detection area for malicious software.

9. An apparatus for accelerating scanning comprising:
    at least one computer processor configured to execute at least one driver, wherein the at least one driver is configured to:
        monitor, at a load-point, registries to identify a detection area map;
        determine when a detection area changes, wherein the detection area map identifies one or more files loaded at a load-point, and wherein the detection area map comprises, for the one or more files, at least one of digital signature information, last modification date, and results of previous file scans of the one or more files identified within the detection area map;
        create a file attribute cache comprising information about at least one file to determine if the at least one file requires scanning, wherein the file attribute cache further comprises an indicia of a definition set used to scan a file; and
        re-evaluate the detection area when the detection area has changed with respect to the detection area map.

10. The apparatus of claim 9, further comprising:
    at least one second driver configured to: monitor a file system to identify at least one file in the detection area map that is altered after creation of the detection area map.

11. The apparatus of claim 10, wherein re-evaluating the detection area comprises scanning files that have been altered.

12. The apparatus of claim 9, further comprising:
    monitoring load points to determine when entries in the detection area map are no longer valid.

13. The apparatus of claim 9, further comprising:
    upon modification of the at least one file, creating indicia to indicate the at least one file requiring scanning.

14. The apparatus of claim 9, wherein re-evaluating the detection area comprises scanning the detection area for malicious software.

* * * * *